United States Patent
Gefen et al.

(10) Patent No.: US 11,487,641 B1
(45) Date of Patent: *Nov. 1, 2022

(54) MICRO SERVICES RECOMMENDATION SYSTEM FOR IDENTIFYING CODE AREAS AT RISK

(71) Applicant: EMC IP Holding Company LLC, Hopkinton, MA (US)

(72) Inventors: Avitan Gefen, Lehavim (IL); Roi Gamliel, Tkuma (IL); Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/694,107

(22) Filed: Nov. 25, 2019

(51) Int. Cl.
*G06F 8/75* (2018.01)
*G06F 11/36* (2006.01)
*G06F 11/30* (2006.01)

(52) U.S. Cl.
CPC .......... *G06F 11/3612* (2013.01); *G06F 8/75* (2013.01); *G06F 11/302* (2013.01); *G06F 11/3624* (2013.01)

(58) Field of Classification Search
CPC .............. G06F 11/3612; G06F 11/302; G06F 11/3624; G06F 8/75
USPC ........................................................ 717/124
See application file for complete search history.

(56) References Cited

U.S. PATENT DOCUMENTS

| | | | |
|---|---|---|---|
| 10,684,940 B1 * | 6/2020 | Kayal | G06F 11/3664 |
| 10,721,791 B1 * | 7/2020 | Gamliel | H04W 76/36 |
| 10,769,250 B1 * | 9/2020 | Tautschnig | G06F 8/436 |
| 10,936,291 B1 * | 3/2021 | Gamliel | G06F 8/443 |
| 2011/0145785 A1 * | 6/2011 | Centonze | G06F 8/4434 717/108 |
| 2011/0321007 A1 * | 12/2011 | Marum | G06F 8/65 717/113 |
| 2012/0110557 A1 * | 5/2012 | Singh | G06F 11/368 717/133 |
| 2015/0268939 A1 * | 9/2015 | Kelapure | G06F 8/75 717/112 |
| 2017/0185783 A1 * | 6/2017 | Brucker | H04L 63/1433 |
| 2017/0364495 A1 * | 12/2017 | Srinivasan | G06K 9/00483 |
| 2018/0039570 A1 * | 2/2018 | Rajagopalan | G06F 11/3688 |
| 2018/0060225 A1 * | 3/2018 | Tao | G06F 11/3612 |
| 2018/0121315 A1 * | 5/2018 | Abadi | G06F 8/71 |
| 2018/0157579 A1 * | 6/2018 | Rozenberg | G06F 8/71 |
| 2018/0164970 A1 * | 6/2018 | Volkerink | G06F 9/451 |
| 2018/0181485 A1 * | 6/2018 | Simbara | G06F 11/3688 |

(Continued)

*Primary Examiner* — Jason D Mitchell
(74) *Attorney, Agent, or Firm* — Dergosits & Noah LLP; Todd A. Noah

(57) ABSTRACT

Identifying risky code in microservices is described. A system identifies a modification to code segments in an application. The system determines a segments similarity score based on comparing the code segments, which are in a microservice of the application, against other code segments, which are in another microservice of the application. The system determines whether the segments similarity score satisfies a segments similarity threshold. The system outputs a recommendation to make the modification, which was made to the code segments in the microservice of the application, to the other code segments in the other microservice in the application, in response to a determination that the segment similarity score satisfies the similarity threshold.

17 Claims, 4 Drawing Sheets

(56) References Cited

U.S. PATENT DOCUMENTS

| | | | |
|---|---|---|---|
| 2019/0129704 A1* | 5/2019 | Beard | G06F 8/65 |
| 2019/0146787 A1* | 5/2019 | Shin | G06F 8/77 |
| | | | 717/101 |
| 2019/0294504 A1* | 9/2019 | Giannetti | G06F 11/1438 |
| 2019/0303266 A1* | 10/2019 | Bonnell | G06F 16/9024 |
| 2020/0257680 A1* | 8/2020 | Danyi | G06F 11/3409 |
| 2020/0341754 A1* | 10/2020 | Kunjuramanpillai | G06F 8/63 |
| 2020/0366752 A1* | 11/2020 | White | H04L 67/327 |
| 2020/0401386 A1* | 12/2020 | Punathil | G06F 8/436 |
| 2021/0142159 A1* | 5/2021 | Gupta | H04L 67/30 |

\* cited by examiner

MICRO SERVICES RECOMMENDATION SYSTEM FOR IDENTIFYING CODE AREAS AT RISK

BACKGROUND

Microservices are a software development technique, and a variant of the service-oriented architecture style that structures a software application as a collection of loosely coupled services. In a microservices architecture, the loosely coupled services are fine-grained services and their communication protocols are lightweight. Decomposing an application into smaller services improves modularity, which makes the application easier to understand, develop, and test. This application decomposition parallelizes development by enabling small autonomous teams to develop, deploy, and scale their respective services independently.

The use of a microservices architecture suggests the adoption of new development methodologies, such dropping the widely-recognized development principal that is known as Don't Repeat Yourself, which is referred to by the acronym DRY. In simple terms, DRY means that developers should avoid the duplication of code. However, applying the DRY principal in a microservices architecture can lead to significant amounts of coupling between microservices, to the extent that a distributed monolith is built. Many microservices developers have concluded that the problems caused by too much coupling between microservices are worse than the problems caused by the duplication of code. Therefore, microservices developers may decompose software applications into microservices that include duplicate code.

Along with the benefits of microservices architecture, comes the cost of managing complex environments that may be composed of hundreds of moving parts. Since different microservices may be developed by different developer teams that are completely separated from each other and that communicate only through protocols implies that no individual developer or team of developers knows the entire code base. The ability to track and monitor potentially hundreds of microservices developed by different developer teams can introduce a significant amount of complexity in the maintenance of an application.

Automatic intelligent tools have become more essential in development environments to help developers and developer teams reduce risky code, which is code that is inefficient, code that causes errors, and/or code that causes the failure of an application. However, such tools for standard object-oriented code do not take code structure or code duplication into account and are not configured to handle a microservices architecture.

DETAILED DESCRIPTION

Figure 1:
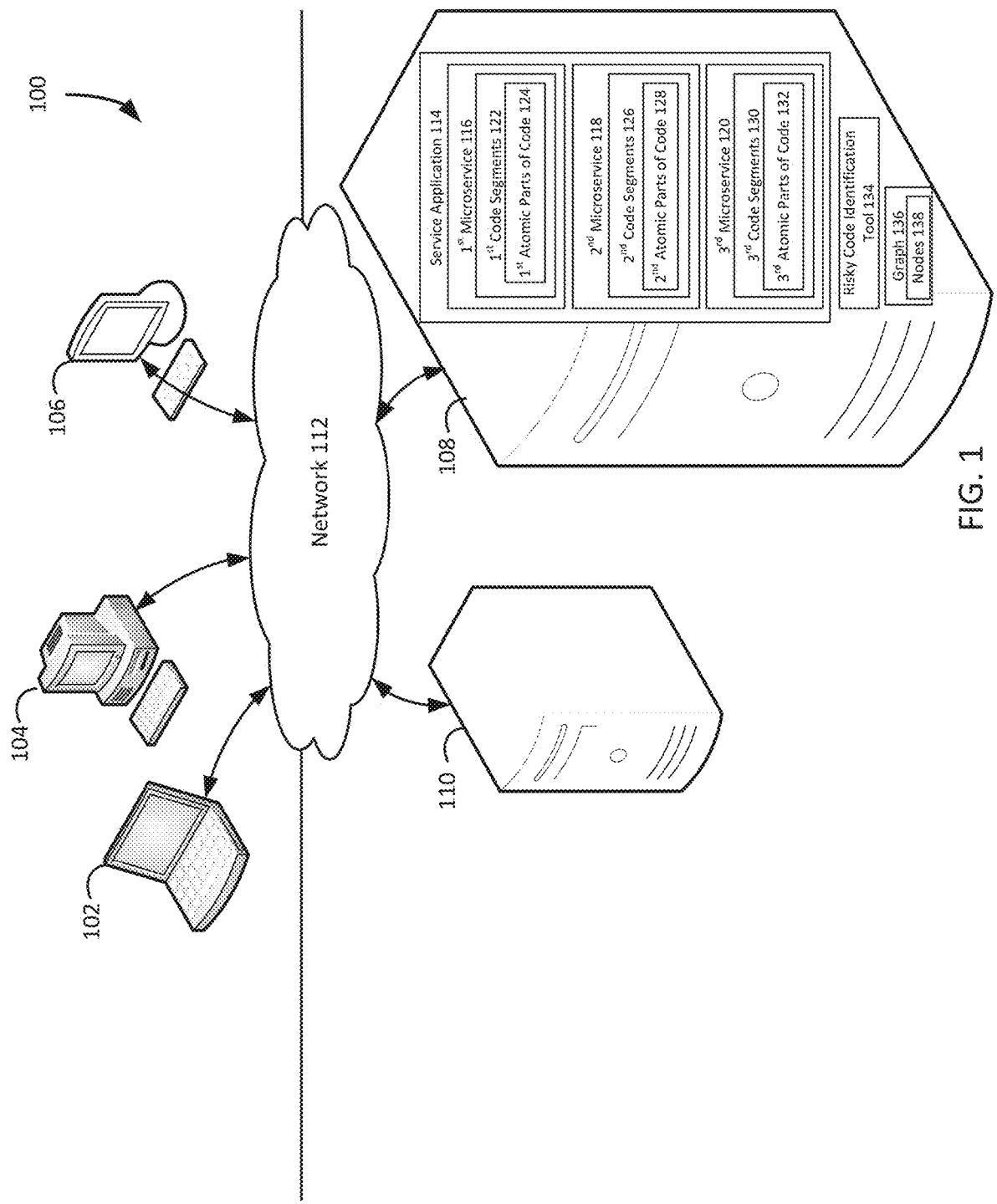
FIG. 1 illustrates a block diagram of an example system for identifying risky code in microservices, under an embodiment.

In addition to adding new features to microservices code while developing and maintaining an application's microservices, developers can modify microservices code that is risky microservices code, which is microservices code that is inefficient, microservices code that causes errors, and/or microservices code that causes failure of the microservices' application. Such modifications may be referred to as fixing bugs. If a developer identifies and modifies such risky microservices code, a similar modification might be applicable to code in other microservices that is also considered as risky microservices code because the code in the other microservices is similar enough to the risky microservices code that the developer needed to modify to correct.

Embodiments herein identify risky code in microservices. A system identifies a modification to code segments in an application. The system determines a segments similarity score based on comparing the code segments, which are in a microservice of the application, against other code segments, which are in another microservice of the application. If the segments similarity score satisfies a segments similarity threshold, the system outputs a recommendation to make the modification, which was made to the code segments in the microservice of the application, to the other code segments in the other microservice in the application.

For example, a risky code identification tool identifies that a developer modified code segments in an application, and references a graph for the application to determine that the developer modified an atomic part C of code in a mobile backend for frontend to become the atomic part C* of code. The risky code identification tool uses a diff utility to compare the atomic part C of code for the Mobile Backend for Frontend against the atomic part C of code for the Web Backend for Frontend, which results in a segments similarity score of 0.98. Since the segments similarity score of 0.98 for the atomic part C of code for the Mobile Backend for Frontend compared against the atomic part C of code for the Web Backend for Frontend satisfies the segments similarity threshold of 0.75, the risky code identification tool outputs a recommendation to make the modification, which the developer already made to the atomic part C of code for the Mobile Backend for Frontend, to the atomic part C of code for the Web Backend for Frontend.

Such a recommendation can reduce costs due to better utilization of engineering resources and the reduction of risky microservices code, which results in better customer experiences. The risky code identification tool can reduce working hours of engineers by enabling the engineers to focus on implementation and/or development, instead of focusing on identifying and modifying risky code that may be scattered throughout hundreds of an application's microservices. The risky code identification tool enables faster time to production and faster feature development of simpler and less risky code, which provides a significant advantage to developing products which compete against similar products that are developed with risky code in microservices. The ability to release new features faster and react faster to customer requests can elevate customer experience and satisfaction.

FIG. 1 illustrates a block diagram of a system that implements identifying risky code in microservices, under an embodiment. As shown in FIG. 1, system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108 and a second server 110 that may be provided by a hosting company. Although FIG. 1 depicts the first client 102 as a laptop computer 102, the second client 104 as a personal computer 104, and the third client 106 as an Apple® Macintosh computer 106, each of the clients 102-106 may be any type of computer, such as a server. The clients 102-106 and the servers 108-110 communicate via a network 112. Any combination of the servers 108-110 may be any combination of physical computers and virtual machines, or virtual servers. Although FIG. 1 depicts the system 100 with three clients 102-106, two servers 108-110, and one network 112, the system 100 may include any number of clients 102-106, any number of servers 108-110, and any number of networks 112. The clients 102-106 and the servers 108-110 may each be substantially similar to the system 400 depicted in FIG. 4 and described below in reference to FIG. 4.

The first server 108 includes a service application 114 that includes a first microservice 116, a second microservice 118, and a third microservice 120. The first microservice 116 includes first codes segments 122 that include a first atomic part of code 124, the second microservice 118 includes second codes segments 126 that include a second atomic part of code 128, and the third microservice 120 includes third codes segments 130 that include a third atomic part of code 132. The first server 108 also includes a risky code identification tool 134 and a graph 136 that includes connected nodes 138. FIG. 1 depicts the service application 114 and the risky code identification tool 134 residing completely on the first server 108, but the service application 114 and/or the risky code identification tool 134 may reside completely on any of the clients 102-106, completely on the second server 110, or in any combination of partially on the first server 108, partially on the clients 102-106, and partially on the second server 110. The service application 114 and/or the risky code identification tool 134 may provide a plug-in to any of the clients 102-106 and/or the servers 108-110 that enables any of the clients 102-106 and/or the servers 108-110 to execute the service application 114 and/or the risky code identification tool 134.

If a developer identifies and modifies risky code in a microservice, a similar modification might be applicable to code in other microservices that is also considered as risky code because the code in the other microservices is similar enough to the risky code that the developer modified. Therefore, the system 100 would need to scan the entire code for the microservices' application for any microservices code which may be similar enough to the risky code that the developer already modified to benefit from a similar modification. However, simply searching the entire code for the microservices' application for any microservices code which may be similar enough to the microservices code that a developer modified may be a lengthy and inefficient process, such as searching an application that includes 10,000 lines of code for every 25 consecutive lines of code that are similar to 25 lines of code that the developer modified.

Figure 2:
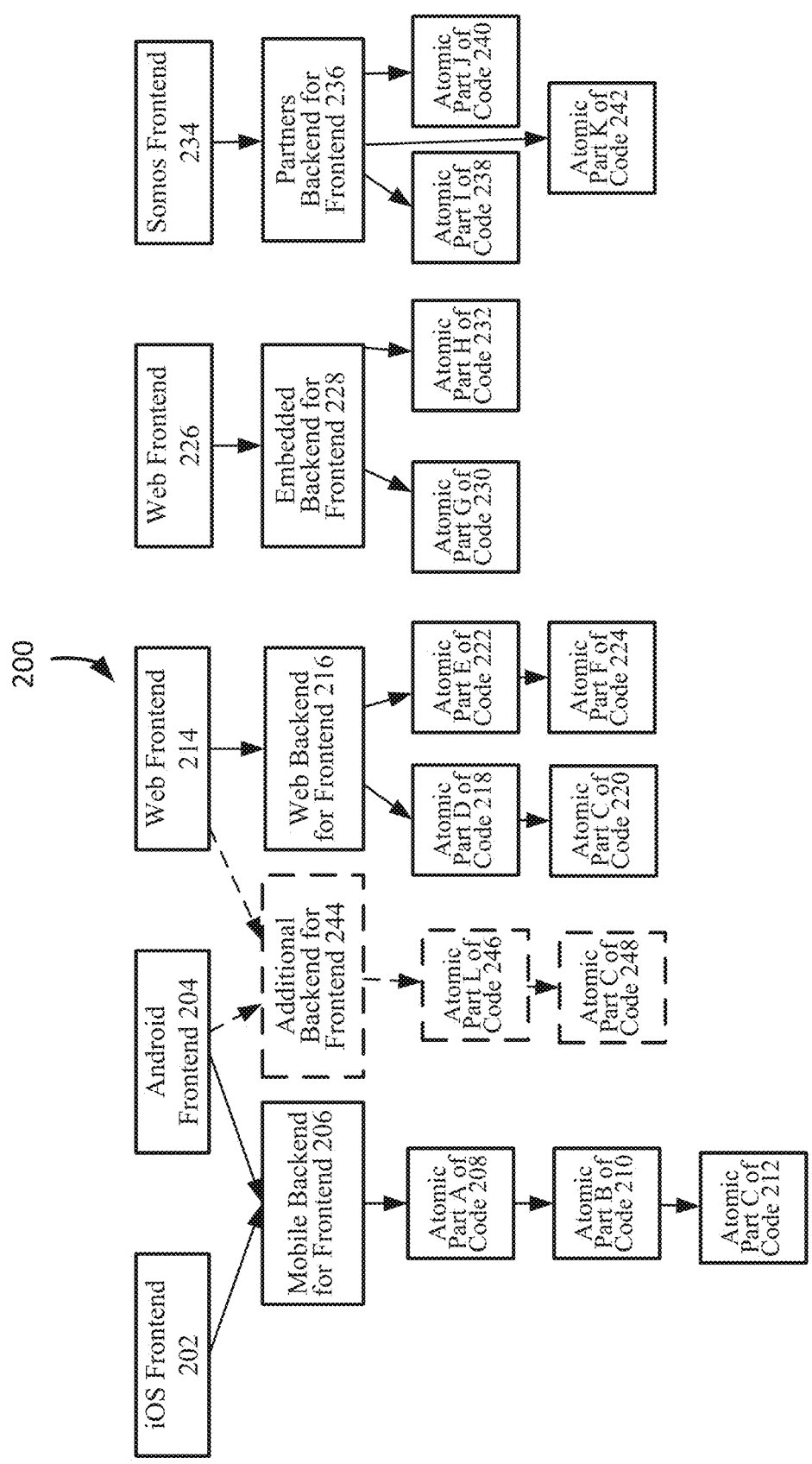
FIG. 2 illustrates an example graph for identifying risky code in microservices, under an embodiment

To enable finding risky code in an application's microservices code, the risky code identification tool 134 uses unified modeling language (UML) to generate a connected graph that represent the relations between atomic parts of the application's code. Unified modeling language is a general-purpose, developmental, modeling language in the field of software engineering that provides a standard way to visualize the design of a system. Therefore, the system 100 can generate a graph of connected nodes, comprising a node, which represents an atomic part of code in a microservice in an application, and another node, which represents another atomic part of code in another microservice of the application. For example, the risky code identification tool 134 uses unified modeling language to generate the graph 200 of connected nodes of the service application 114, as depicted by FIG. 2.

By generating a graph of connected nodes that represent atomic parts in the microservices of an application, the system 100 can search the application's code more efficiently. For example, searching for an atomic part of code that is sufficiently similar to an atomic part of code that was subsequently modified would only require the comparisons of a relatively few atomic parts of code rather than the comparisons of every possible permutation of the lines of code that have been modified might have in an application's relatively large total lines of code. Furthermore, after the risky code identification tool 134 identifies the microservice which includes the code segments that the developer modified, the subsequent search for similar code segments does not need to search any of the atomic parts of code in the microservice that includes the code segments that the developer modified.

A graph can be a diagram representing a system of connections among things. A node can be a point at which lines or pathways intersect or branch. A connected node can be a point at which lines or pathways intersect or branch. An atomic part of code can be a functionally irreducible portion of a computer program that contains executable instructions. A microservice can be a loosely coupled service in a software application. An application can be a computer program or software designed and written to fulfill a particular purpose of a user.

The graph 200 includes an iOS frontend 202, an Android frontend 204, and their corresponding first microservice 116, which is a mobile Backend for Frontend 206. The mobile Backend for Frontend 206 contains the first code segments 122 that include the corresponding first atomic parts of code 124, such as an atomic part A of code 208, an atomic part B of code 210, and an atomic part C of code 212. The graph 200 also includes a web frontend 214 and its corresponding second microservice 118, which is a web Backend for Frontend 216. The web Backend for Frontend 216 contains the corresponding second code segments 126 that include the second atomic parts of code 128, such as an atomic part D of code 218, an atomic part C of code 220, an atomic part E of code 222, and an atomic part F of code 224.

The graph 200 further includes a web frontend 226 and its corresponding third microservice 120, which is an embedded Backend for Frontend 228. The embedded Backend for Frontend 228 contains the corresponding third code segments 130 that include the third atomic parts of code 132, such as an atomic part G of code 230 and an atomic part H of code 232. The graph 200 additionally includes a Somos frontend 234 and its corresponding microservice, which is a partners Backend for Frontend 236. The partners Backend for Frontend 236 contains code segments that include atomics part of code, such as an atomic part I of code 238, an atomic part J of code 240, and an atomic part K of code 242. The graph 200 can also include an additional Backend for Frontend 244, and an atomic part L of code 246 and an atomic part C of code 248 for the additional Backend for Frontend 244.

After generating the graph 200 of connected nodes of the service application 114, the system 100 identifies a modification to code segments in an application. For example, the risky code identification tool 134 identifies that a developer modified code segments in the service application 114, and references the graph 200 for the service application 114 to determine that the developer modified the atomic part C of code 212 in the mobile backend for frontend 206 to become the atomic part C* of code 212, which is not depicted by FIG. 2. Although this example describes a modification of code segments that are contained in only one atomic part of code, if the modified code segments spanned multiple atomic parts of code, then the risky code identification tool 134 would separately apply the same process to each of the multiple atomic parts of code. A modification can be an action that changes something. A code segment can be a portion of a computer program that contains executable instructions.

Following the identification of the modification to code segments in the application, the system 100 applies graphical analysis over the unified modeling language graph of the application to identify code segments in other microservices. For example, the risky code identification tool 134 references the graph 200 to identify the other microservices and their atomic parts of code, which include the web backend for frontend 216 and its atomic parts of service 218-224, the embedded backend for frontend 228 and its atomic parts of service 230 and 232, the partners backend for frontend 236 and its atomic parts of code 238-242, and possibly the additional backend for frontend 244 and its atomic parts of service 246 and 248.

Having identified code segments in another microservice, the system 100 can automatically utilize software/text similarity algorithms to determine which of the code segments in the other microservice are similar to the code segments that a developer modified, such that these similar code segments in the other microservice may be risky microservices code. To identify similar code in a large amount of an application's code, which may have evolved through many development cycles, the risky code identification tool 134 can use a diff utility, which is a line-oriented data comparison tool, to identify similarities in large amounts of code. Similar to the Levenshtein-distance algorithm, the diff utility determines the smallest set of deletions and insertions to create one file that is being compared from another file that is being compared. The risky code identification tool 134 can use a diff utility to compare atomic parts of code in another microservice to the atomic part of code that the developer modified, and calculate a similarity score that is based on the number of changes needed to change the evaluated atomic parts of code to the atomic part of code which the developer modified. For the most accurate comparison, the diff utility can base the comparison on a copy of an atomic part of code which was copied before the developer modified this atomic part of code. If the system 100 does not retain such a pre-modification copy, the diff utility can base the comparison on an atomic part of code after the developer modified this atomic part of code.

After identifying code segments in another microservice, segments the system 100 determines a similarity score based on comparing code segments, which were modified in a microservice of an application, against other code segments, which are in another microservice of the application, For example, the risky code identification tool 134 uses a diff utility to compare the atomic part C of code 212 for the Mobile Backend for Frontend 206 against the atomic part C of code 220 for the Web Backend for Frontend 216, which results in a segments similarity score of 0.98. In other examples, the diff utility's comparison of the atomic part C of code 212 against the atomic part D of code 218, the atomic part E of code 222, and the atomic part F of code 224 resulted in very low similarity scores that are close to 0.00. Although these examples use segments similarity scores in the range from 0.00 to 1.00, any range and type of segments similarity score may be used. A segments similarity score can be a number that expresses the resemblance between portions of executable computer instructions.

Following the calculation of the segments similarity score, the system 100 determines whether the segments similarity score satisfies a segments similarity threshold. If the similarity score satisfies a predefined threshold, the risky code identification tool 134 will consider the compared code segments to be sufficiently similar for recommending the same modification of the code segments that were identified as sufficiently similar. For example, the risky code identification tool 134 determines whether the segments similarity score of 0.98, which was based on comparing the atomic part C of code 212 for the Mobile Backend for Frontend 206 against the atomic part C of code 220 for the Web Backend for Frontend 216, satisfies the segments similarity threshold of 0.75. In another example, the risky code identification tool 134 determines whether the segments similarity score of 0.0, which was based on comparing the atomic part C of code 212 for the Mobile Backend for Frontend 206 against the atomic part E of code 222 for the Web Backend for Frontend 216, satisfies the segments similarity threshold of 0.75. If the segments similarity score satisfies the segments similarity threshold, then the system 100 recommends that the modification to the code segments that the developer modified be made to the code segments which are determined to be similar to the code segments that the developer modified. If the segments similarity score does not satisfy the segments similarity threshold, the system 100 evaluates whether any other code segments are similar to the code segments that the developer modified. A segments similarity threshold can be the magnitude that must be satisfied by a number, which expresses the resemblance between portions of executable computer instructions, for a specific result to occur.

If the segments similarity score for the code segments that the developer modified in the microservice of the application and the other code segments in the other microservice of the application satisfies the segments similarity threshold, the system 100 outputs a recommendation to make the modification, which the developer made to the code segments in the microservice, to the other code segments in the other microservice, For example, since the segments similarity score of 0.98 for the atomic part C of code 212 for the Mobile Backend for Frontend 206 compared against the atomic part C of code 220 for the Web Backend for Frontend 216 satisfies the segments similarity threshold of 0.75, the risky code identification tool 134 outputs a recommendation to make the modification, which the developer already made to the atomic part C of code 212 for the Mobile Backend for Frontend 206, to the atomic part C of code 220 for the Web Backend for Frontend 216. Continuing this example, a system administrator receives the recommendation and manually makes the modification, which the developer already made to the atomic part C of code 212 for the Mobile Backend for Frontend 206, to the atomic part C of code 220 for the Web Backend for Frontend 216, thereby creating the atomic part C* of code 220 for the Web Backend for Frontend 216. A recommendation can be a proposal as to the best course of action.

In an alternative continuation of the example, a system administrator receives the recommendation to make the developer's previous modification to the current atomic part C of code 220 for the Web Backend for Frontend 216, but the administrator does not follow this recommendation. In this alternative example, the system administrator learns that the developer's previous modification was an addition of features, instead of a correction, to the atomic part C of code 212 for the Mobile Backend for Frontend 206, and learns that this addition of features in inapplicable to the atomic part C of code 220 for the Web Backend for Frontend 216.

In a double recommendation example, the system administrator manually makes the modification, which the developer already made to the atomic part C of code 212 for the Mobile Backend for Frontend 206, to the atomic part C of code 220 for the Web Backend for Frontend 216, thereby creating the atomic part C* of code 220 for the Web Backend for Frontend 216, but does not make the modification to the atomic part C of code 248 for the Additional Backend for Frontend 244. For this double recommendation example, the system administrator followed the first recordation and rejected the second recommendation due to learning that a different developer is scheduled to make a different type of modification to the atomic part C of code 248 for the Additional Backend for Frontend 244.

In addition to or as an alternative to outputting a recommendation to make the modification, which was made to the code segments in the microservice of the application, to the other code segments in the other microservice of the application, the system 100 can output a selectable option to make the modification to the other code segments in the other microservice of the application. For example, the risky code identification tool 134 outputs the selectable option to make the modification, which the developer already made to the atomic part C of code 212 for the Mobile Backend for Frontend 206, to the atomic part C of code 220 for the Web Backend for Frontend 216. An option can be a thing that may be chosen.

The system 100 can use the diff utility's comparison of two atomic parts of code in two microservices to identify the differences between the two atomic parts of code, and then offer to apply these identified differences to either of the two atomic parts of code to make these atomic parts of code identical. For example, after the developer modifies the atomic part C of code 212 to become the atomic part C* of code 212, the risky code identification tool 134 uses the diff utility to compare the unmodified atomic part C of code 212 against the unmodified atomic part C of code 220. For this example, the comparison of the unmodified atomic parts of code identifies 2 lines of code that are different between the 100 lines of code in the unmodified atomic part C of code 212 and the 100 lines of code in the unmodified atomic part C of code 220, and uses the ratio of modified lines of code to total lines of code in an atomic part of code as the basis for determining the segments similarity score.

The risky code identification tool 134 can also use the diff utility to compare the modified atomic part C* of code 212 against the unmodified atomic part C of code 220. For this example, the comparison of a modified atomic part of code and an unmodified atomic parts of code identifies 25 lines of code that are different between the 100 lines of code in the modified atomic part C* of code 212 and the 100 lines of code in the unmodified atomic part C of code 220. Consequently, the risky code identification tool 134 can offer a selectable option to use the identified 25 lines of code that are different between the 100 lines of code in the modified atomic part C* of code 212 and the 100 lines of code in the unmodified atomic part C of code 220 for modifying the unmodified atomic part C of code 220 to become a copy of the modified atomic part C* of code 212. If the system administrator identifies the modification that the developer already made to modify the unmodified atomic part C of code 212 to become the modified atomic part C* of code 212 and decides to make this same modification to modify the unmodified atomic part C of code 220 to become the modified atomic part C* of code 220, the system administrator can manually modify from 23 to 27 lines of code in the unmodified atomic part C of code 220 to create the modified atomic part C* of code 220. Alternatively, the system administrator can select the option that instructs the risky code identification tool 134 to use the identified 25 lines of code that are different between the 100 lines of code in the modified atomic part C* of code 212 and the 100 lines of code in the unmodified atomic part C of code 220 for modifying the unmodified atomic part C of code 220 to become a copy of the modified atomic part C* of code 212 for the Web Backend for Frontend 216. Then the system administrator would have to manually modify at most 2 lines of code in the copy of the modified atomic part C* of code 212 for the Web Backend for Frontend 216 to create the modified atomic part C* of code 220 for the Web Backend for Frontend 216.

If the option is selected to make the modification, which was made to the code segments in the microservice of the application, to the other code segments in the other microservice of the application, the system 100 can make the modification to the other code segments in the other microservice of the application. For example, the risky code identification tool 134 makes the modification, which the developer already made to the atomic part C of code 212 for the Mobile Backend for Frontend 206, to the atomic part C of code 220 for the Web Backend for Frontend 216.

Figure 3:
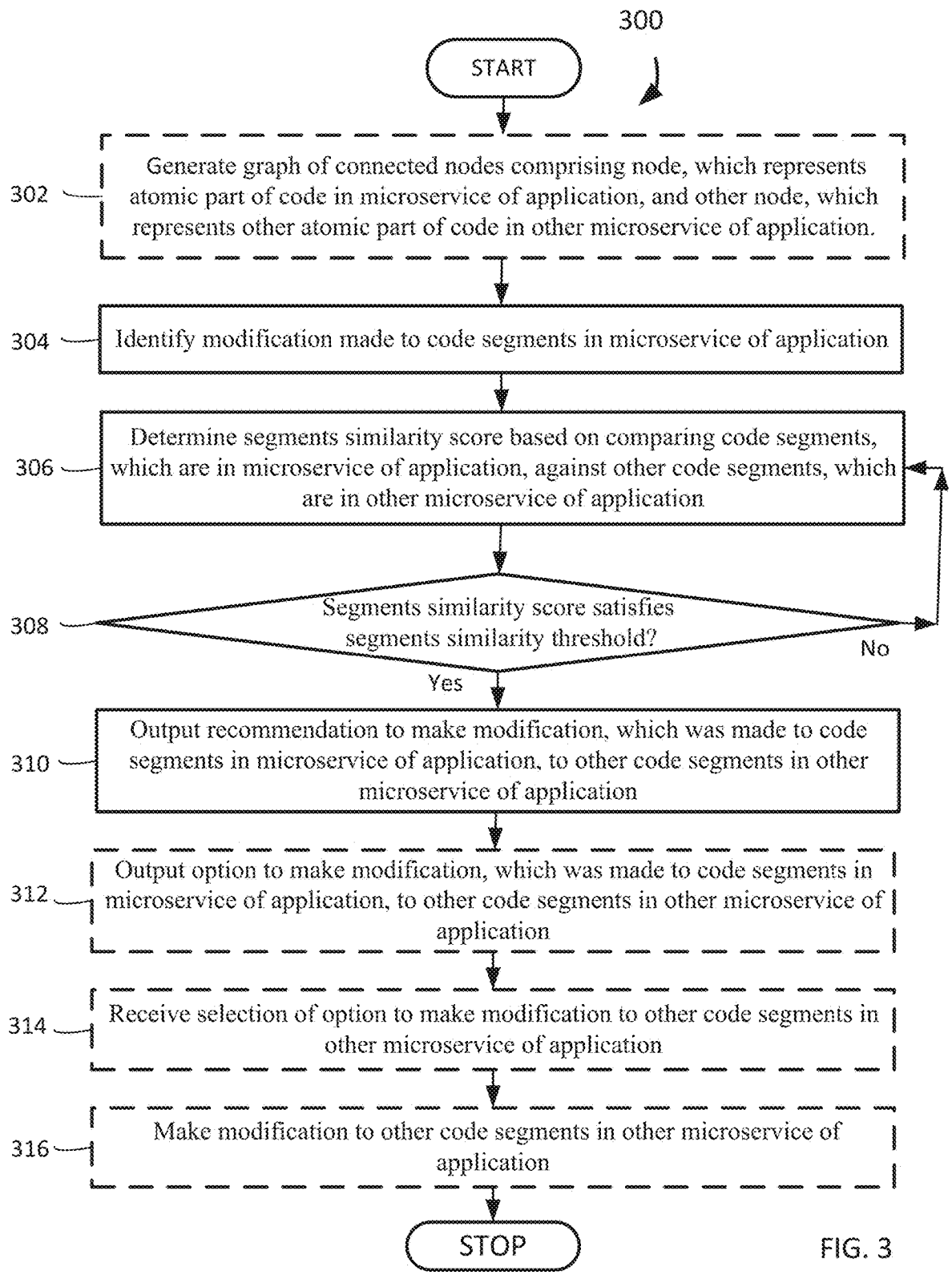
FIG. 3 depicts a flowchart that illustrates a method for identifying risky code in microservices, under an embodiment.

FIG. 3 depicts a flowchart that illustrates a method for identifying risky code in microservices, under an embodiment. Flowchart 300 illustrates method acts illustrated as flowchart blocks for certain steps involved in and/or between the clients 102-106 and/or the servers 108-110 of FIG. 1.

A graph of connected nodes is optionally generated, comprising a node, which represents an atomic part of code in a microservice of an application, and another node, which represents another atomic part of code in another microservice of the application, block 302. The system 100 can generate graphs to identify modifications that were made to some code segments that should be made to other code segments. For example, and without limitation, this can include the risky code identification tool 134 using unified modeling language to generate the graph 200 of connected nodes depicted by FIG. 2.

A modification to code segments in a microservice is identified, block 304. The system 100 identifies modifications made to some code segments that might need to be made to other code segments. By way of example and without limitation, this can include the risky code identification tool 134 identifying that a developer modified code segments in the service application 114, and referencing the graph 200 for the service application 114 to determine that the developer modified the atomic part C of code 212 in the mobile backend for frontend 206 to become the atomic part C* of code 212, which is not depicted by FIG. 2

After identifying a modification to code segments, a segments similarity score is determined based on comparing the code segments, which were modified in a microservice of an application, against other code segments, which are in another microservice of the application, block 306. The system 100 searches for similar code segments in different microservices. In embodiments, this can include the risky code identification tool 134 using a diff utility to compare the atomic part C of code 212 for the Mobile Backend for Frontend 206 against the atomic part C of code 220 for the Web Backend for Frontend 216, which results in a segments similarity score of 0.98.

Following the calculation of a segments similarity score, a determination is made whether the segments similarity score satisfies a segments similarity threshold. block 308. The system 100 determines whether code segments are sufficiently similar for recommending the same modification to be made to code segments in another microservice. By way of example and without limitation, this can include the risky code identification tool 134 determining whether the segments similarity score of 0.98, which was based on comparing the atomic part C of code 212 for the Mobile Backend for Frontend 206 against the atomic part C of code 220 for the Web Backend for Frontend 216, satisfies the segments similarity threshold of 0.75. If the segments similarity score satisfies the segments similarity threshold, then the method 300 continues to block 310 to recommend making the same modification to the code segments that are identified as sufficiently similar to the code segments that the developer modified. If the segments similarity score does not satisfy the segments similarity threshold, the method 300 returns to block 306 to evaluate whether any modifications should be made to any other code segments.

If a segments similarity score satisfies a segments similarity threshold, a recommendation is output to make the modification, which was made to the code segments in the microservice of the application, to the other code segments in the other microservice in the application, block 310. The system 100 recommends that modifications that were made to some code segments also be made to other code segments that are sufficiently similar to the code segments that the developer modified. In embodiments, this can include the risky code identification tool 134 outputting a recommendation to make the modification, which the developer already made to the atomic part C of code 212 for the Mobile Backend for Frontend 206, to the atomic part C of code 220 for the Web Backend for Frontend 216, because the segments similarity score of 0.98 for the atomic part C of code 212 for the Mobile Backend for Frontend 206 compared against the atomic part C of code 220 for the Web Backend for Frontend 216 satisfies the segments similarity threshold of 0.75, Having output a recommendation to make the modification, which was made to the code segments in the microservice of the application, to the other code segments in another microservice of the application, an option is optionally output to make the modification to the other code segments in the other microservice of the application, block 312. The system 100 outputs an option to make a modification of risky code in a microservice. In embodiments, this can include the risky code identification tool 134 outputting the option to make the modification, which the developer already made to the atomic part C of code 212 for the Mobile Backend for Frontend 206, to the atomic part C of code 220 for the Web Backend for Frontend 216.

After outputting an option to make the modification, which was made to the code segments in the microservice of the application, to the other code segments in the other microservice of the application, a selection is optionally received of the option to make the modification to the other code segments in the other microservice of the application, block 314. The system 100 receives the selection of an option to make a modification of risky code in a microservice. By way of example and without limitation, this can include the risky code identification tool 134 receiving a system administrator's selection of the option to make the modification, which the developer already made to the atomic part C of code 212 for the Mobile Backend for Frontend 206, to the atomic part C of code 220 for the Web Backend for Frontend 216

Having received the selection of an option to make the modification, which was made to the code segments in the microservice of the application, to the other code segments in the other microservice of the application, the modification is optionally made to the other code segments in the other microservice of the application, block 316. The system 100 makes a modification of risky code in a microservice. Making the modification to the other code segments in the other microservice of the application may include making the modification, which was made to an atomic part of code in the code segments in the microservice of the application, to another atomic part of code in the other code segments in the other microservice of the application. By way of example and without limitation, this can include the risky code identification tool 134 making the modification, which the developer already made to the atomic part C of code 212 for the Mobile Backend for Frontend 206, to the atomic part C of code 220 for the Web Backend for Frontend 216.

Although FIG. 3 depicts the blocks 302-316 occurring in a specific order, the blocks 302-316 may occur in another order. In other implementations, each of the blocks 302-316 may also be executed in combination with other blocks and/or some blocks may be divided into a different set of blocks.

Figure 4:
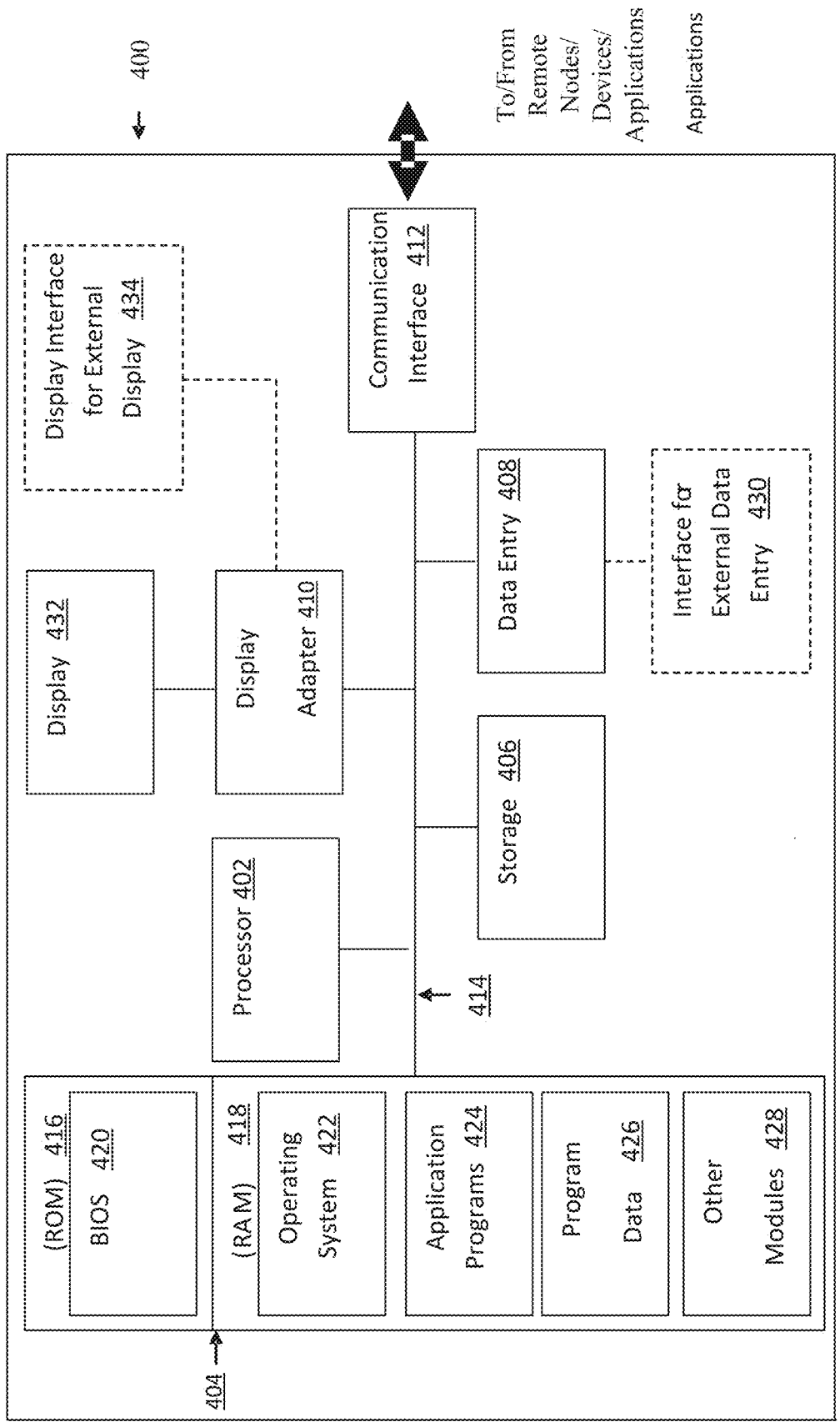
FIG. 4 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, data entry module 408, display adapter 410, communication interface 412, and a bus 414 that couples elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in memory 404 and/or storage 406 and/or received via data entry module 408.

The memory 404 may include read only memory (ROM) 416 and random access memory (RAM) 418. Memory 404 may be configured to store program instructions and data during operation of device 400. In various embodiments, memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAM-BUS DRAM (RDRAM), for example. Memory 404 may also include nonvolatile memory technologies such as nonvolatile flash RAM (NVRAM) or ROM. In some embodiments, it is contemplated that memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, ROM 416 or RAM 418, including an operating system 422, one or more applications programs 424, program data 426, and other program modules 428. A user may enter commands and information into the hardware device 400 through data entry module 408. Data entry module 408 may include mechanisms such as a keyboard, a touch screen, a pointing device, etc. Other external input devices (not shown) are connected to the hardware device 400 via external data entry interface 430. By way of example and not limitation, external input devices may include a microphone, joystick, game pad, satellite dish, scanner, or the like. In some embodiments, external input devices may include video or audio input devices such as a video camera, a still camera, etc. Data entry module 408 may be configured to receive input from one or more users of device 400 and to deliver such input to processing unit 402 and/or memory 404 via bus 414.

A display 432 is also connected to the bus 414 via display adapter 410. Display 432 may be configured to display output of device 400 to one or more users. In some embodiments, a given device such as a touch screen, for example, may function as both data entry module 408 and display 432. External display devices may also be connected to the bus 414 via external display interface 434. Other peripheral output devices, not shown, such as speakers and printers, may be connected to the hardware device 400.

The hardware device 400 may operate in a networked environment using logical connections to one or more remote nodes (not shown) via communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 412 may include logic configured to support direct memory access (DMA) transfers between memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the preceding context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for identifying risky code in microservices, the system comprising:
    one or more processors; and
    a non-transitory computer readable medium storing a plurality of instructions, which when executed, cause the one or more processors to:
        generate a graph of connected nodes comprising nodes which represent atomic parts of executable code in code segments in micro services of an application, an atomic part of executable code comprising a functionally irreducible portion of a computer program that contains executable instructions;
        identify, by applying graph analysis over the graph, a node at any graphical level that represents an atomic part of executable code in code segments modified by a modification, and in a microservice in the application, and other connected nodes at any graph levels that represent other atomic parts of executable code in other code segments in other microservices in the application;
        determine a segments similarity score based on comparing the modified atomic part of executable code in the code segments represented by the identified node, and in the microservice of the application, against another atomic part of executable code in other code segments represented by another node, and in another microservice of the application;
        determine whether the segments similarity score satisfies a segments similarity threshold; and
        output a recommendation to make the modification, which was made to the code segments in the microservice of the application, to the other code segments in the other microservice in the application, in response to a determination that the segments similarity score satisfies the segments similarity threshold.

2. The system of claim 1, wherein identifying the modification to the code segments in the application comprises identifying the modification in an atomic part of executable code in the code segments in the microservice of the application.

3. The system of claim 1, wherein comparing the code segments against the other code segments comprises comparing a copy of an atomic part of executable code in the code segments, which was created before the modification to the code segments, against another atomic part of executable code in the other code segments.

4. The system of claim 1, wherein comparing the code segments against the other code segments comprises comparing an atomic part of executable code in the code segments, after the modification was made to the code segments, against another atomic part of executable code in the other code segments.

5. The system of claim 1, wherein the plurality of instructions further causes the processor to:
    output an option to make the modification, which was made to the code segments in the microservice of the application, to the other code segments in the other microservice of the application; and
    make the modification to the other code segments in the other microservice of the application, in response to receiving a selection of the option to make the modification to the other code segments in the other microservice of the application.

6. The system of claim 5, wherein making the modification to the other code segments in the other microservice of the application comprises making the modification, which was made to an atomic part of executable code in the code segments in the microservice of the application, to another atomic part of executable code in the other code segments in the other microservice of the application.

7. A computer-implemented method for identifying risky code in microservices, the computer-implemented method comprising:
    generating a graph of connected nodes comprising nodes which represent atomic parts of executable code in code segments in microservices of an application, an atomic part of executable code comprising a functionally irreducible portion of a computer program that contains executable instructions;
    identifying, by applying graph analysis over the graph, a node at any graph level that represents an atomic part of executable code in code segments modified by a modification, and in a microservice in the application, and other connected nodes at any graph levels that represent other atomic parts of executable code in other code segments in other microservices in the application;
    determining a segments similarity score based on comparing the modified atomic part of executable code in the code segments represented by the identified node, and in the microservice of the application, against another atomic part of executable code in other code segments represented by another node, and in another microservice of the application;
    determining whether the segments similarity score satisfies a segments similarity threshold; and outputting a recommendation to make the modification, which was made to the code segments in the microservice of the application, to the other code segments in the other microservice in the application, in response to a determination that the segments similarity score satisfies the segments similarity threshold.

8. The computer-implemented method of claim 7, wherein identifying the modification to the code segments in the application comprises identifying the modification in an atomic part of executable code in the code segments in the microservice of the application.

9. The computer-implemented method of claim 7, wherein comparing the code segments against the other code segments comprises comparing a copy of an atomic part of executable code in the code segments, which was created before the modification to the code segments, against another atomic part of executable code in the other code segments.

10. The computer-implemented method of claim 7, wherein comparing the code segments against the other code segments comprises comparing an atomic part of executable code in the code segments, after the modification was made to the code segments, against another atomic part of executable code in the other code segments.

11. The computer-implemented method of claim 7, wherein the computer-implemented method further comprises:
outputting an option to make the modification, which was made to the code segments in the microservice of the application, to the other code segments in the other microservice of the application; and
making the modification to the other code segments in the other microservice of the application, in response to receiving a selection of the option to make the modification to the other code segments in the other microservice of the application.

12. The computer-implemented method of claim 11, wherein making the modification to the other code segments in the other microservice of the application comprises making the modification, which was made to an atomic part of executable code in the code segments in the microservice of the application, to another atomic part of executable code in the other code segments in the other microservice of the application.

13. A computer program product for identifying risky code in microservices, the computer program product comprising a non-transitory computer-readable medium having a computer-readable program code embodied therein to be executed by one or more processors, the program code including instructions to:
generate a graph of connected nodes comprising nodes which represent atomic parts of executable code in code segments in microservices of an application, an atomic part of executable code comprising a functionally irreducible portion of a computer program that contains executable instructions;
identify, by applying graph analysis over the graph, a node at any graph level that represents an atomic part of executable code in code segments modified by a modification, and in a microservice in the application, and other connected nodes at any graph levels that represent other atomic parts of executable code in other code segments in other microservices in the application;
determine a segments similarity score based on comparing the modified atomic part of executable code in the code segments represented by the identified node, and in the microservice of the application, against another atomic part of executable code in other code segments represented by another node, and in another microservice of the application;
determine whether the segments similarity score satisfies a segments similarity threshold; and
output a recommendation to make the modification, which was made to the code segments in the microservice of the application, to the other code segments in the other microservice in the application, in response to a determination that the segments similarity score satisfies the segments similarity threshold.

14. The computer program product of claim 13, wherein identifying the modification to the code segments in the application comprises identifying the modification in an atomic part of executable code in the code segments in the microservice of the application.

15. The computer program product of claim 13, wherein comparing the code segments against the other code segments comprises comparing a copy of an atomic part of executable code in the code segments, which was created before the modification to the code segments, against another atomic part of executable code in the other code segments.

16. The computer program product of claim 13, wherein comparing the code segments against the other code segments comprises comparing an atomic part of executable code in the code segments, after the modification was made to the code segments, against another atomic part of executable code in the other code segments.

17. The computer program product of claim 13, wherein the program code includes further instructions to:
output an option to make the modification, which was made to the code segments in the microservice of the application, to the other code segments in the other microservice of the application; and
make the modification to the other code segments in the other microservice of the application, in response to receiving a selection of the option to make the modification to the other code segments in the other microservice of the application, wherein making the modification to the other code segments in the other microservice of the application comprises making the modification, which was made to an atomic part of executable code in the code segments in the microservice of the application, to another atomic part of executable code in the other code segments in the other microservice of the application.

* * * * *